(12) United States Patent
Naka et al.

(10) Patent No.: US 6,482,779 B2
(45) Date of Patent: Nov. 19, 2002

(54) LUBRICATING GREASE COMPOSITION AND ROLLING APPARATUS COMPRISING SAME

(75) Inventors: Michiharu Naka, Kanagawa (JP); Atsushi Yokouchi, Kanagawa (JP); Koichi Hachiya, Kanagawa (JP); Toru Takamizawa, Kanagawa (JP); Jun Kuraishi, Kanagawa (JP); Yasunobu Fujita, Kanagawa (JP); Hiroshi Kimura, Kanagawa (JP); Akimi Kimura, Kanagawa (JP); Yuji Onuki, Kanagawa (JP)

(73) Assignees: NSK Ltd., Tokyo (JP); Kyodo Yushi Co., Ltd., Tokyo (JP)

( * ) Notice: Subject to any disclaimer, the term of this patent is extended or adjusted under 35 U.S.C. 154(b) by 0 days.

(21) Appl. No.: 09/813,285

(22) Filed: Mar. 21, 2001

(65) Prior Publication Data

US 2002/0002119 A1 Jan. 3, 2002

(30) Foreign Application Priority Data

Mar. 21, 2000  (JP) ......................................... 2000-078709

(51) Int. Cl.$^7$ ................... C10M 105/38; C10M 105/48; C10M 117/00
(52) U.S. Cl. ...................... 508/379; 508/306; 508/442; 508/462; 508/459; 508/506; 508/512
(58) Field of Search .......................................... 508/462

(56) References Cited

U.S. PATENT DOCUMENTS

| | | | |
|---|---|---|---|
| 2,739,127 A | 3/1956 | Morway | 252/41 |
| 2,872,417 A | 2/1959 | Jordan et al. | 252/42.1 |
| 3,502,580 A | 3/1970 | Coupland et al. | 252/42.1 |
| 4,410,435 A | 10/1983 | Naka et al. | 252/42.1 |
| 6,235,690 B1 * | 5/2001 | Shibayama et al. | 508/462 |
| 6,258,762 B1 * | 7/2001 | Akiyama | 508/462 |
| 6,261,999 B1 * | 7/2001 | Akiyama | 508/100 |
| 6,265,361 B1 * | 7/2001 | Akiyama et al. | 508/462 |
| 6,271,182 B1 * | 8/2001 | Akiyama | 508/364 |

FOREIGN PATENT DOCUMENTS

| | | | | |
|---|---|---|---|---|
| GB | 2 241 707 A | 9/1991 | ........ | C10M/135/18 |
| WO | 95/35355 | 12/1995 | ........ | C10M/169/06 |
| WO | 96/02615 | 2/1996 | ........ | C10M/169/06 |

OTHER PUBLICATIONS

Patent Abstracts of Japan, vol. 1998, No. 11, (Sep. 30, 1998) & JP 10 169657 A (Nippon Seiko KK), (Jun. 23, 1998).

* cited by examiner

Primary Examiner—Ellen M. McAvoy
(74) Attorney, Agent, or Firm—Sughrue Mion, PLLC

(57) ABSTRACT

A lubricating grease composition having a basic grease composition containing a synthetic oil as a base oil, and a lithium soap as a thickener. 0.5 to 10% by weight with respect to the basic grease composition total amount of at least one additive selected from the group consisting of an organic molybdenum compound, an organic fatty acid compound or an derivative thereof, and an organic phosphorus compound is added is provided. Accordingly, the present invention can provide a lubricating grease composition capable of providing excellent lubricating characteristics, fretting wear resistance property, and impact resistance property.

12 Claims, 6 Drawing Sheets

LUBRICATING GREASE COMPOSITION AND ROLLING APPARATUS COMPRISING SAME

BACKGROUND OF THE INVENTION

The present invention relates to a lubricating grease composition and more particularly to a lubricating grease composition which, when enclosed in a spindle bearing which is one of parts of various motors or the like or a rolling apparatus for machine tool or the like which oscillates at a small stroke, exhibits excellent lubricating properties and provides drastic improvements in resistance to fretting developed by repeated impact and oscillation caused by exterior oscillation as occurring during transportation and dropping impact developed by dropping during transportation and low torque properties.

The present invention also relates to a rolling bearing land a rolling apparatus which comprise the foregoing lubricating grease composition enclosed therein to provide improvements in fretting abrasion properties, impact resistance and low torque properties.

Various kinds of greases to be sealed in a ball bearing for a spindle motor have been developed conventionally for a recording device such as a hard disc of a computer, and a CD-R. The present inventor has proposed a lubricating grease composition containing 50 to 100% by weight of a carbonic ester compound with respect to a base oil, and a lithium soap as a thickener, aiming at a low friction coefficient and prolongation of a sound life (JP-A-2000-26875). Moreover, a lubricating grease composition synthesized from a carbonic ester compound, a hydroxide of an alkaline metal or an alkaline earth metal, and a higher fatty acid having 10 or more carbon atoms or a higher hydroxy fatty acid having one or more hydroxyl group and 10 or more carbon atoms, aiming at little dust generation (scattering), a small torque, the excellent sound characteristics, and a long life, is also known (JP-A-2000-63874).

Linear guide devices such as linear guide and ball screw are widely used for machine tool, etc. These rolling apparatus are filled with a grease for lubrication. Most ordinary greases merely comprise a high viscosity oil as a base oil but are free of additives other than rust preventive.

A rolling apparatus filled with a conventional high viscosity base oil-containing grease exhibits a satisfactory durability when it makes a reciprocating motion at a great stroke but is latently disadvantageous in that when it makes a reciprocating motion at a small stroke, i.e., oscillatory motion, it undergoes fretting abrasion that deteriorates the durability thereof.

A rolling bearing for use in hard disc or the like, too, is required to have resistance to fretting abrasion developed by repeated impact and oscillation caused by exterior oscillation during transportation. Such a rolling bearing has also been required to attain the reduction of the entire size thereof or have improvements in rotary properties such as rotary speed, torque and acoustic properties and have resistance to dropping impact.

In view of the circumstances, the invention has been achieved, and an object thereof is to provide a lubricating grease composition capable of providing the excellent lubricating characteristics, fretting resistance characteristics, and impact resistance characteristics.

Another object of the invention is to provide a rolling bearing and a rolling apparatus having improved fretting abrasion resistance, impact resistance and low torque properties.

SUMMARY OF THE INVENTION

The object can be achieved by a lubricating grease composition according to the invention, having a basic grease composition containing a synthetic oil as a base oil, and a lithium soap as a thickener, wherein 5 to 10% by weight with respect to the basic grease composition total amount of at least one additive selected from the group consisting of an organic molybdenum compound, an organic fatty acid compound or an organic fatty acid derivative, and an organic phosphorus compound is added.

In order to accomplish the foregoing objects of the invention, the present invention also provides a rolling bearing comprising a plurality of rolling elements held rollably between an inner ring and an outer ring and the foregoing grease composition enclosed therein.

In order to accomplish the foregoing objects of the invention, the present invention further provides a rolling apparatus comprising a rolling element provided between an exterior member and an inner member wherein the rolling element rolls on a first contact surface at which the exterior member comes in contact with the rolling element and a second contact surface at which the interior member comes in contact with the rolling element, characterized in that the foregoing lubricating grease composition is enclosed therein.

The term "rolling apparatus" as used herein is meant to indicate a linear guide or ball screw. The term "exterior member" as used herein is meant to indicate a slider or guide rail for linear guide or nut for ball screw. The term "interior member" as used herein is meant to indicate a guide rail or slider for linear guide or screw axis for ball screw. Accordingly, in the case of linear guide, the first contact surface at which the exterior member comes in contact with the rolling element is the slider or the race on the guide rail while the second contact surface at which the interior member comes in contact with the rolling element is the race on the guide rail or the slider. In the case of ball screw, the race on the nut forms the first contact surface while the race on the screw axis forms the second contact surface.

The lubricating grease composition according to the invention uses, as the base oil in the basic grease composition, a synthetic oil capable of forming an oil film having a low viscosity so as to provide the excellent close contact property with respect to the rolling contact surface and the sliding surface. The base oil may preferably be a carbonic ester oil or a polyol ester oil. Accordingly, the low torque property, the wear impact resistance property, and the fretting resistance property can be enhanced. Moreover, since a lithium salt, preferably a lithium stearate salt is used as the thickener, formation of a lubricating film to be softened by application of a shearing stress at the time of rolling or sliding so as to provide the excellent adhesion property with respect to the rolling contact surface can be promoted.

In addition to the above-mentioned basic grease composition, since 0.5 to 10% by weight of at least one selected from the group consisting of an organic molybdenum compound, an organic phosphorus compound, and an organic fatty acid compound or an organic fatty acid derivative is added, the fretting wear resistance property, the low torque property, the impact resistance property, the wear resistance property, the impression resistance property, and the drop impact property by a dropping trouble, required particularly to a bearing for a HDD can be improved or provided.

DETAILED DESCRIPTION OF THE PREFERRED EMBODIMENTS

The present invention will be further described hereinafter in connection with the attached drawings.
Grease composition
(Base oil)

In a lubricating grease composition according to the invention, a synthetic oil is used as the base oil of the basic grease composition. Among the synthetic oils, a carbonic ester compound represented by the below-mentioned formula (I) is preferable:

$$R^1O—CO—OR^2 \quad (I).$$

In the formula, $R^1$ and $R^2$ each independently represent a saturated or unsaturated, linear or branched alkyl group having 6 to 30 carbon atoms. As the branched alkyl group, one represented by $—CH_2CHR^3R^4$ is preferable. In the formula, $R^3$ is a saturated linear alkyl group having 1 to 7 carbon atoms, and $R^4$ is a saturated linear alkyl group having 4 to 12 carbon atoms. Those having the total 11 to 13 carbon atoms for $R^3$ and $R^4$ are particularly preferable.

Furthermore, a diester oil obtained by a reaction of a dibasic acid and a branched alcohol, an aromatic ester oil obtained by a reaction of an aromatic group-based tribasic acid and a branched alcohol, and a hindered ester oil obtained by a reaction of a polyhydric alcohol and a monobasic acid can also be used preferably as the synthetic oil.

As the diester oil, a dioctyl adipate (DOA), a diisobutyl adipate (DIBA), a dibutyl adipate (DBA), a dioctyl azelate (DOZ), a dibutyl sebacate (DBS), a dioctyl sebacate (DOS), a methyl-acetyl ricinoleate (MAR-N), or the like can be presented.

As the aromatic ester oil, a trimellitic acid ester, a trioctyl trimellitate (TOTM), a tridecyl trimellitate, a tetraoctyl pyromellitate, or the like can be presented.

As the hindered ester oil, those obtained by optionally reacting a polyhydric alcohol mentioned below and a monobasic acid can be presented. The monobasic acid to be reacted with the polyhydric alcohol can be used alone or in a plurality. Furthermore, it can be used as a complex ester of an oligoester of a polyhydric alcohol and a mixed aliphatic group of a dibasic acid and a monobasic acid.

As the polyhydric alcohol, a trimethylol propane (TMP), a pentaerythritol (PE), a dipentaerythritol (DPE), a neopentyl glycol (NPG), a 2-methyl-2-propyl-1,3-propane (MPPD), or the like can be presented.

As the monobasic acid, a monovaleic aliphatic acid group having a 4 to 18 carbon atoms can be used mainly. Specifically, an acetic acid, a valeric acid, a caproic acid, a caprylic acid, an enanthic acid, a pelargonic acid, a capric acid, a undecanoic acid, a laurylic acid, a mistylic acid, a palmitic acid, a beef fallow acid, a stearic acid, a caproleic acid, a undecylenic acid, a linderic acid, a tuzu acid, a fisetelic acid, a myristreic acid, a palmitreic acid, a petrocelic acid, an oleic acid, an elaidic acid, an ascrepic acid, a baccenic acid, a sorbic acid, a linoleic acid, a linolenic acid, a sabinic acid, a ricinolic acid, or the like can be presented.

Among the above-mentioned ester-based synthetic oils, the carbonic ester oil and the polyol ester oil are preferable. For example, in the case of a bearing for a spindle of a HDD motor, which strongly requires the impact resistance property with respect to the repeated impact or swaying, during the transportation, and the low torque performance, or the like, a low viscosity (low torque performance) and a good close contact property with respect to the rolling contact surface or the sliding surface having a metal surface of a bearing raceway surface, a rolling element, a cage, or the like are required for quickly forming a thin film for improving the wear or impact resistance property as the base oil. The carbonic ester oil and the polyol ester oil can preferably respond to these demands. Moreover, the carbonic ester oil and the polyol ester oil can also provide a good fretting resistance property.

Furthermore, it is preferable that these base oils have a 15 to 150 $mm^2/s$ kinematic viscosity at 40° C. With a kinematic viscosity at 40° C. less than 15 $mm^2/s$, since the oil film strength is low, the fretting wear can easily be generated by the external vibration at the time of transportation. In contrast, with a kinematic viscosity at 40° C. more than 150 $mm^2/s$, since the kinematic viscosity of the lubricating oil is high, the rotational torque is increased. Moreover, in order to further reduce the fretting wear and improve the low torque performance by also utilizing the effect of an additive described later, a 70 $mm^2/s$ or less kinematic viscosity at 40° C. is more preferable.

Furthermore, as the base oil, a synthetic hydrocarbon oil such as an ether oil and a poly α-olefin can also be used. As the ether oil, an alkyl polyphenyl ether oil having 12 to 20 carbon atoms with a (di)alkyl chain derived, such as a diphenyl, a triphenyl, a tetraphenyl, or the like can be presented. Moreover, as the synthetic hydrocarbon oil, an α-olefin, and a cooligomer synthetic oil with an ethylene can also be used.

(Thickener)

A thickener to be used in the invention is a lithium soap. In particular, a lithium stearate, a 12-hydroxy lithium stearate, or the like are preferable, and the lithium stearate is particularly preferable. If the lithium stearate soap is applied with a shearing force on the rolling contact surface of a rolling bearing, it is softened so as to be adsorbed or adhered easily on the rolling element surface, or the raceway surface of a bearing ring, and thus the excellent close contact property can be provided as well as a lubricating film can easily be formed on the rolling contact surface that determines rolling so that improvement of the fretting resistance property, the wear resistance property, and the low torque performance can be enhanced. The amount thereof is not particularly limited as long as a penetration appropriate as a grease can be obtained, and 5 to 25% by weight with respect to the basic grease composition total amount is preferable.

(Additive)

(1) Organic molybdenum compound

The organic molybdenum compound is a preferable organic metal compound for adsorbing on a metal surface as a rolling contact surface so as to form a highly reactive coat film (reaction film layer), which is added for serving as an extreme pressure additive so as to improve the burning resistance, the load resistance, and the wear resistance even under a high load and a low speed. In particular, a molybdenum dithiophosphate (Mo-DTP) is preferable.

Similarly, as an organic metal compound for forming an organic metal compound-reaction film layer, metal dihydrocarbyl dithiophosphates, metal dihydrocarbyl dithiocarbamates, naphthenates, or the like can be presented. These compounds can also be used in a combination as needed.

The above-mentioned metal dihydrocarbyl dithiophosphates are a metal dihydrocarbyl dithiophosphate with each hydrocarbyl group having 4 to 20 carbon atoms. Examples thereof include a Zn dimethyl dithiophosphate, a Zn butyl isooctyl dithiophosphate, a Zn di(4-methyl-2-pentyl) dithiophosphate, a Zn di(tetrapropenyl phenyl) dithiophosphate, a Zn (2-ethyl-1-hexyl)dithiophosphate, a Zn (isooctyl)dithiophosphate, a Zn (ethyl phenyl) dithiophosphate, a Zn (amyl)dithiophosphate, and a Zn di(hexyl)dithiophosphate. Furthermore, those containing a lead (Pb), a cadmium (Cd), an antimony (Sb) or the like as the metal other than the zinc (Zn) are also preferable.

The above-mentioned metal dihydrocarbyl dithiocarbamates are a metal dihydrocarbyl dithiocarbamate with each hydrocarbyl group having 4 to 20 carbon atoms. Examples thereof include a Zn dimethyl dithiocarbamate, a Zn butyl isooctyl dithiocarbamate, a Zn di(4-methyl-2-pentyl) dithiocarbamate, a Zn di(tetrapropenyl phenyl) dithiocarbamate, a Zn (2-ethyl-1-hexyl)dithiocarbamate, a Zn (isooctyl)dithiocarbamate, a Zn (ethyl phenyl) dithiocarbamate, a Zn (amyl)dithiocarbamate, and a Zn di(hexyl)dithiocarbamate. Furthermore, those containing a lead (Pb), a cadmium (Cd), an antimony (Sb), a nickel (Ni), an iron (Fe) or the like as the metal other than the zinc (Zn) are also preferable.

(2) Organic fatty acid compound or organic fatty acid derivative

As the organic fatty acid, an oleic acid, a naphthenic acid, an abietic acid (resin acid), a lanolin fatty acid, a succinic acid, an amino acid derivative, or the like can be presented. As the succinic acid derivative, an alkenyl succinic acid is preferable because the alkenyl succinic acid preferably adsorbs on the rolling contact surface or the sliding surface as a metal material so as to form a thin film even in the case it is affected by the moisture content such as the moisture content in the air wherein the device using the rolling bearing is installed, the dew condensation, or the like. Moreover, a succinic acid derivative provides the same effect.

As the succinic acid derivative, for example, a succinic acid, an alkyl succinic acid, an alkyl succinic acid half ester, an alkenyl succinic acid, an alkenyl succinic acid half ester, a succinic acid imide, or the like can be presented. These succinic acid derivatives can optionally be used alone or in a combination.

(3) Organic phosphorus compound

As the organic phosphorus compound, a phosphite ester is preferable. The phosphite ester forms a reactive thin film having the excellent extreme pressure property and wear resistance property on a rolling contact surface or a sliding surface. Preferable phosphite esters include a phosphite of hydrocarbons having 1 to 18 carbon atoms (such as an alkyl, a phenyl, a benzyl, a cresyl, a cinnamyl, and an aryl). Examples thereof include a trioctyl phosphite, a triphenyl phosphite, a tricresyl phosphite, a bis-2-ethyl hexyl phosphite, a tridecyl phosphite, a dibutyl hydrogen phosphite, a tris(nonyl phenyl) phosphite, a dilauryl hydrogen phosphite, a diphenyl monodecyl phosphite, a trilauryl trithiophosphite, and a diphenyl hydrogen phosphite.

Moreover, positive phosphate esters can also be used. Preferable positive phosphate esters are a positive phosphate of hydrocarbons having 1 to 18 carton atoms (such as an alkyl, a phenyl, a benzyl, a cresyl, a cinnamyl, and an aryl). Examples thereof include a triphenyl phosphate, a triethyl phosphate, a tributyl phosphate, a tris(2-ethyl hexyl) phosphate, a tris(ethyl hexyl) phosphate, a tridecyl phosphate, a tridecyl phosphate, a diphenyl mono(2-ethyl hexyl) phosphate, a tricresyl phosphate, a trioctyl phosphate, and a tristearyl phosphate.

Furthermore, acidic phosphates can also be used. Preferable acidic phosphates are a mono- or di-hydrocarbir acid phosphate having 1 to 20 carbon atoms. Examples thereof include a methyl acid phosphate, an isopropyl acid phosphate, a butyl acid phosphate, a 2-ethyl hexyl acid phosphate, an isodecyl acid phosphate, a tridecyl acid phosphate, and a lauryl acid phosphate.

The amount of these organic molybdenum compound, organic fatty acid compound or derivative, and organic phosphorus compound is 0.5% by weight to 10% by weight each with respect to the basic grease composition total amount. With a less than 0.5% by weight amount, the reaction film cannot be formed sufficiently homogeneously on the rolling contact surface (metal surface) so that the fretting wear resistance property, the wear resistance property, the shock resistance, and the drop impact resistance property cannot be achieved sufficiently. In particular, as to the fretting wear resistance property, in order to satisfy a 50% or less increase ratio described later (see FIG. 5: vertical axis value), it is preferable to add 1.5% by weight or more. As to the upper limit, even if the amount exceeds 10% by weight, the fretting wear resistance property is saturated, besides, the nature of the grease is changed so that the initial grease is made harder so that the rotational torque can be increased or corrosion can easily be generated on the rolling contact surface. Therefore, in view of the adverse effect by the excessive introduction and obtainment of the above-mentioned performances, a 1.5% by weight to 6.0% by weight amount is further preferable.

Although the organic molybdenum compound, the organic fatty acid compound or derivative, and the organic phosphorus compound can be used alone, by using in a combination, the multiplier effect can be obtained. Although it is not particularly limited, a 1:1 to 1:3 compounding ratio is preferable. In the case of use in a combination, the additive total amount should satisfy the above-mentioned amount range. Moreover, among these additives, in order to achieve the object of the invention, it is most preferable to add an organic phosphorous compound, and a combination of the organic phosphorus compound and other additives.

In addition to the above-mentioned additives, a hydrocarbon-based compound with a lipophilic group such as an alkyl group, an alkenyl group, and an allyl group, having a functional group with a high adsorbing property with respect to a metal surface, such as a hydroxyl group (—OH), and an amino group (—NH$_2$, —NH) can be added to the basic grease composition of the invention. These compounds adsorbs on the rolling contact surface or the sliding surface so as to facilitate the reactivity of the above-mentioned additives.

Furthermore, for example, the below-mentioned conventionally known various kinds of additives can be added selectively to the basic grease composition of the invention.

(Rust preventive agent)

As a rust preventive agent, an organic based sulfonic acid metal or esters are preferable. As the organic based sulfonic acid salt, for example, a dinonyl naphthalene sulfonic acid, a heavy alkyl benzene sulfonic acid, or the like can be used. As a metal salt thereof, a calcium sulfonate, a barium sulfonate, a sodium sulfonate, or the like can be presented. Moreover, as the esters, among sorbitan derivatives, a sorbitan monolaurate, a sorbitan tristearate, a sorbitan monooleate, a sorbitan trioleate, or the like can be presented as a partial ester of a polybasic carboxylic acid and a polyhydric acid. As an alkyl-ester type, a polyoxyethylene laurate, a polyoxyethylene oleate, a polyoxyethylene stearate, or the like can be presented.

These rust preventive agents can be used as an organic based sulfonic acid metal salt or esters alone or as a mixture thereof. In consideration of improvement of the rust preventive property and restraint of the fretting wear, a sulfonic acid based metal salt such as a calcium sulfonate can be used preferably.

(Antioxidant)

As an antioxidant, a nitrogen compound based antioxidant or a phenol based antioxidant alone, or a mixture thereof is preferable. As the nitrogen compound based antioxidant, a phenyl α naphthyl amine, a diphenyl amine, a phenylene diamine, an oleyl amide amine, a phenothiazine, or the like can be presented. Moreover, as the phenol based antioxidant, hindered phenols such as a p-t-butyl-phenyl salicylate, a 2,6-di-t-butyl-p-phenyl phenol, a 2,2'-methylene bis(4-methyl-6-t-octyl phenol), a 4,4'-butylidene bis-6-t-butyl-m-cresol, a tetrakis[methylene-3-(3',5'-di-t-butyl-4'-hydroxy phenyl) propionate]methane, 1,3,5-trimethyl-2,4,6-tris(3,5-di-t-butyl-4-hydroxy benzyl) benzene, an n-octadecyl-β-(4'-hydroxy-3',5'-di-t-butyl phenyl) propionate, a 2-n-octylthio-4,6-di(4'-hydroxy-3',5'-di-t-butyl) phenoxy-1,3,5-triazine, a 4,4'-thiobis-[6-t-butyl-m-cresol], and a 2-(2'-hydroxy-3'-t-butyl-5'-methyl phenyl)-5-chlorobenzotriazole can be presented.

The present invention also provides a rolling bearing and a rolling apparatus comprising the foregoing grease composition enclosed therein.

Rolling bearing

Figure 1:
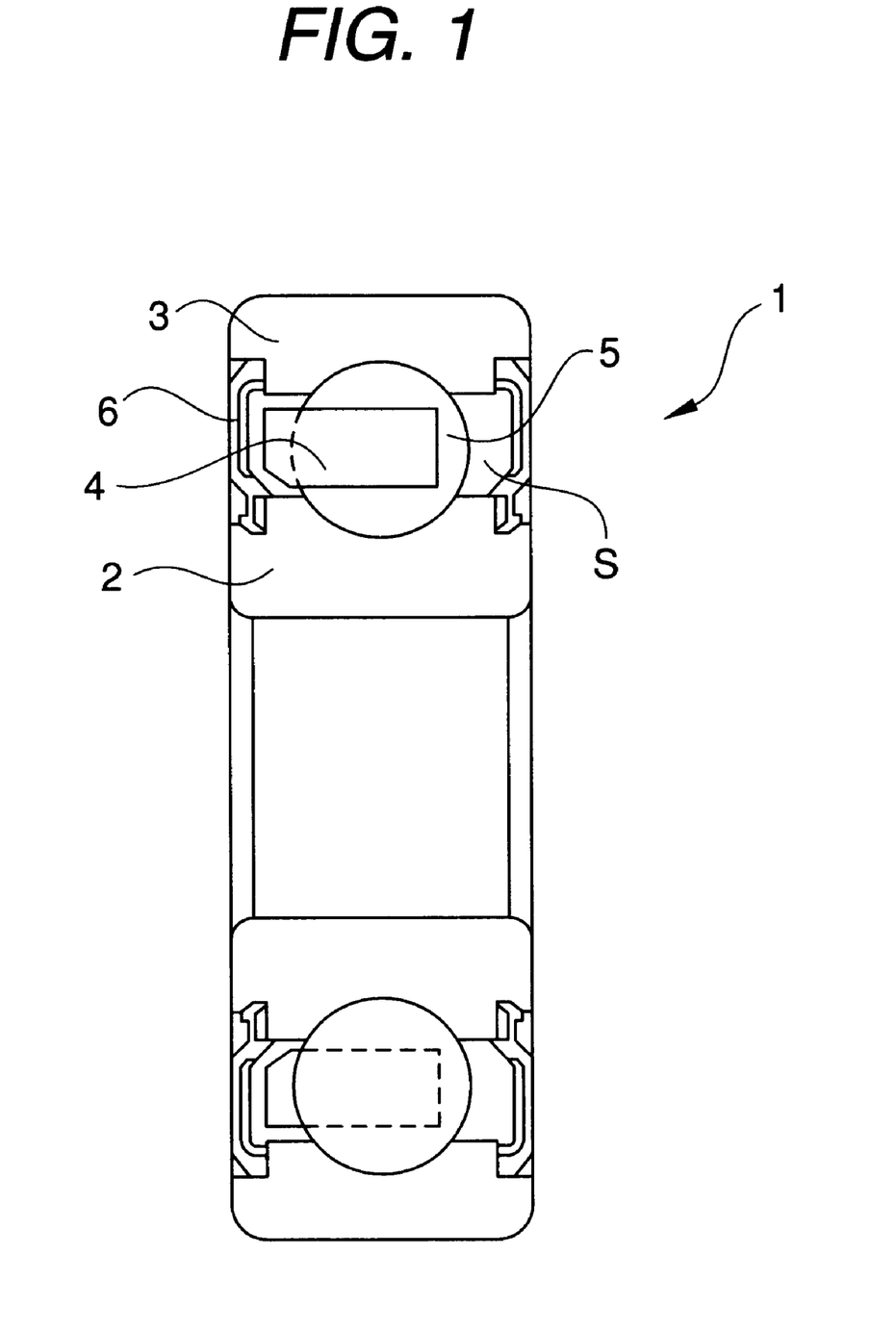
FIG. 1 is a sectional view illustrating the essential part of an example of the rolling bearing according to the invention.

In the invention, the configuration of the rolling bearing itself is not limited. For example, a ball bearing 1 shown sectionally in FIG. 1 can be exemplified. The ball bearing 1 comprises a plurality of balls 5 as rolling elements rollably held between an inner ring 2 and an outer ring 3 with a retainer 4 interposed therebetween and the foregoing grease composition (not shown) packed in the bearing space S formed by the inner ring 2, the outer ring 3 and the ball 5. The ball bearing 1 is sealed with a sealing member 6. The packed amount of the grease composition is preferably in the range of 5% to 20% by volume of the bearing space S.

Rolling apparatus

Examples of the rolling apparatus include linear guide, ball screw, etc. None of these rolling apparatus are limited in configuration itself. The following configurations can be exemplified.

(1) Linear guide

Figure 2:
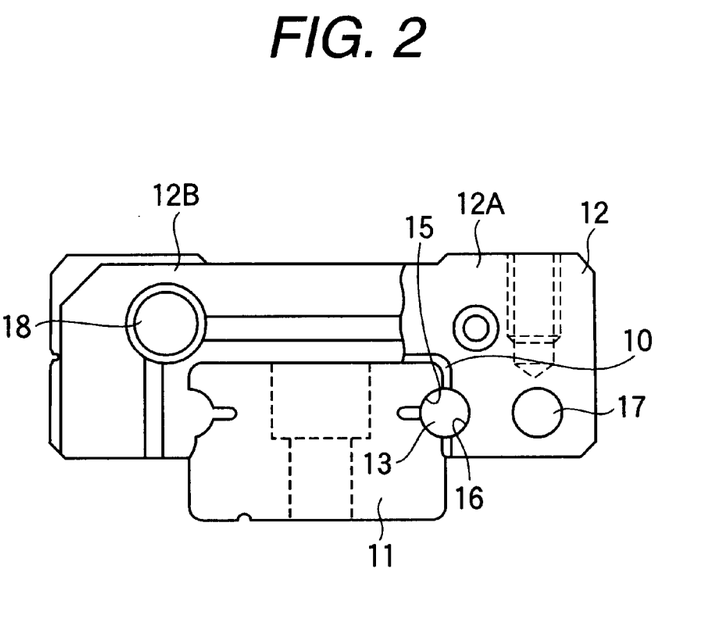
FIG. 2 is a partly cutaway front view of a linear guide as a first example of the rolling apparatus according to the invention.

FIG. 2 is a partially cutaway front view of an example of linear guide. This linear guide comprises a guide rail 11 having a substantially rectangular section as an interior member, a slider 12 having a U-shaped section as an exterior member supported across the guide rail 11, and a plurality of balls 13 provided between the two members as rolling elements. In some detail, the guide rail 11 has a longitudinally long race 15 formed on both sides thereof. On the other hand, the main slider body 12A constituting the slider has a race 16 formed on the inner side thereof facing the race 15. The main slider body 12A also is pierced with a hole parallel to the race 16 to form a rolling element return path 17 in the wing portion thereof. The main slider body 12A further has an end cap 12B attached to both ends thereof with a screw 18 as a constituent part of the slider. These end caps 12B each have a semi-doughnut-shaped curved path (not shown) communicating the race 16 to the rolling element return path 17. In this arrangement, a circulation path for rolling element 13 comprising the race 16, the rolling element return path 17 and the curved path is formed. The circulation path has a plurality of rolling elements 13 held therein in such an arrangement that they don't come off. In this configuration, the first contact surface at which the exterior member 12 comes in contact with the rolling element 13 is the race 16 formed on the inner surface of the slide 12 while the second contact surface at which the interior member 11 comes in contact with the rolling element 13 is the race 15 formed on the outer surface of the guide rail 11.

In the foregoing linear guide, the space formed by the guide rail 11 as an interior member and the slider 12 supported across the guide rail 11 as an exterior member is packed with the foregoing grease composition (indicated by the reference numeral 10) in an amount of, e.g., 20% by volume.

The linear guide is not limited to that shown in FIG. 2. For example, the linear guide may have two or more races 16 formed on the inner surface of the slider 12 as first contact surfaces and two or more races 15 formed on the guide rail as second contact surfaces on one side thereof. Alternatively, the linear guide may have rollers as rolling elements. Still alternatively, the linear guide may have a guide rail having a U-shaped section and a slider provided movably inside the guide rail with rolling elements interposed therebetween. These types of linear guides may be filled with the foregoing grease composition similarly to that shown in FIG. 2.

(2) Ball screw

Figure 3:
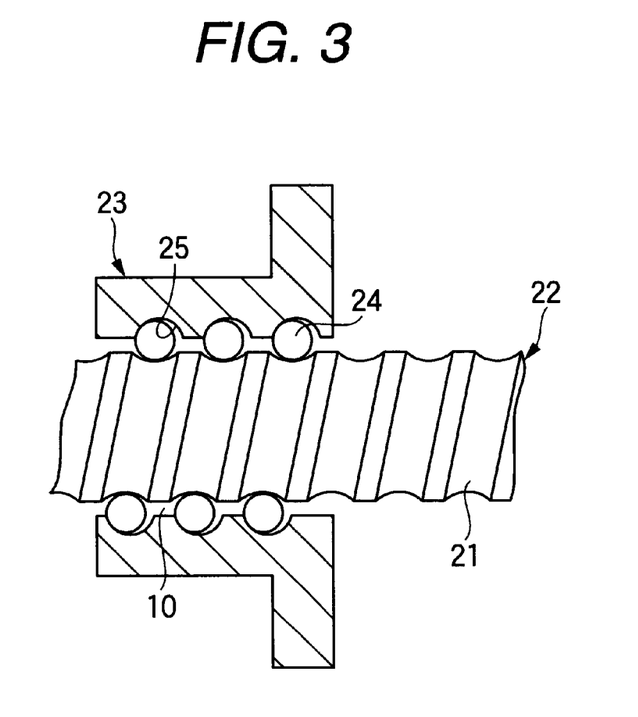
FIG. 3 is a sectional view illustrating the essential part of a ball screw as a second example of the rolling apparatus according to the invention.

FIG. 3 is a sectional view illustrating the essential part of an example of ball screw. This ball screw comprises a tapped axis 22 having a spiral race 21 formed on the periphery thereof as an interior member, and a nut 23 thread-engaged as an exterior member with the tapped axis 22 with a plurality of balls 23 as rolling elements. The nut 23 has a race 25 formed on the inner surface thereof facing the race 21 formed on the tapped axis 22. The rolling elements 24 circulate between the two axial ends of the nut 23 while rolling in the direction of rotation of the tapped axis 22 under the guidance of a ball circulation path (not shown) such as circulation top provided on the body of the nut 23. This ball screw is arranged such that when the tapped axis rotates, the nut 23 moves in the linear direction along the tapped axis 22 with the rolling motion of the rolling element 24. In this configuration, the first contact surface at which the exterior member 23 comes in contact with the rolling element 24 is the race 25 on the nut 23 while the second contact surface at which the interior member 22 comes in contact with the rolling element 24 is the race 21 on the tapped axis 22.

In the foregoing ball screw, the space formed by the tapped axis 22 as an interior member and the nut 23 thread-engaged with the tapped axis 22 as an exterior member is packed with the foregoing grease composition (indicated by the reference numeral 10) in an amount of, e.g., 20% by volume.

The ball screw is not limited to that shown in FIG. 3. For example, the ball screw may be of the tube circulation type comprising a tube for circulating rolling elements. Alternatively, the ball screw may be of the end cap circulation type comprising a circulation path provided in the end cap thereof. These types of ball screws may be filled with the foregoing grease composition similarly to that shown in FIG. 3.

Because of the grease composition enclosed therein, the foregoing rolling bearing and rolling apparatus are provided with improvements in fretting abrasion resistance, low torque properties, impact resistance, abrasion resistance, dent resistance, etc.

EXAMPLES

Hereinafter, the invention will be further explained with reference to examples.

As shown in the table 1, base greases were prepared. The base greases I to III are embodiments particularly preferable as a basic grease composition according to the invention. They were used as a basic grease composition for adding each additive shown in the table 2. Moreover, the table 2 shows embodiments of preferable compounds as the organic molybdenum compound, the organic fatty acid compound and the organic phosphorus compound according to the invention.

TABLE 1

| Base grease | I | II | III | IV |
|---|---|---|---|---|
| Thickening agent (added amount: wt-%) | ① 15 wt-% | ① 15 wt-% | ① 20 wt-% | ② 15 wt-% |
| Base oil (balance) | A | A + B (50:50) | A | B + C (80:20) |
| Mixed viscosity 25° C. | 297 | 297 | 301 | 250 |
| Dropping point ° C. | 186 | 182 | 185 | 192 |
| Copper plate corrosion | Passed | Passed | Passed | Passed |
| Evaporation amount | 0.35 | 0.32 | 0.33 | 0.3 |
| Oil separation degree % 100° C., 24 h | 2.6 | 5.4 | 2.8 | 1.2 |
| Oxidation stability - kPa 99° C., 100 h | 20 | 39 | 30 | 20 |

Thickening agent:
1: Lithium stearate
2: 12-Hydroxystearic acid lithium salt
Ester-based synthetic oil
A: Carbonic acid ester oil (18 mm$^2$/s, 40° C.)
B: Pentaerythritol ester oil (133 mm$^2$/s, 40° C.)
C: Dioctyl sebacate oil (12 mm$^2$/s, 40° C.)

TABLE 2

| | Additive name | Addition purpose: product name |
|---|---|---|
| 1 | Mo-DTP | Organic molybdenum compound "Moriban L" produced by Bandabiruto Corp. |
| 2 | Alkenyl succinic acid anhydride | Succinic acid compound Improvement of the rust prevention property, and the wear resistance property "MSP" produced by Nisseki Kagaku Corp. |
| 3 | Phosphite | Organic phosphorus compound "JP260" produced by Johoku Kagaku Kogyo Corp. |

Example 1

With the base grease III shown in the table 1 used, the Mo=DTP (organic molybdenum compound), the alkenyl succinic acid anhydride (succinic acid compound), and the phosphite (organic phosphorus compound) shown in the table 2 were added thereto with the amount of each changed, and agitated so as to prepare test greases. Moreover, one not containing an additive at all was used for the comparison.

Figure 4:
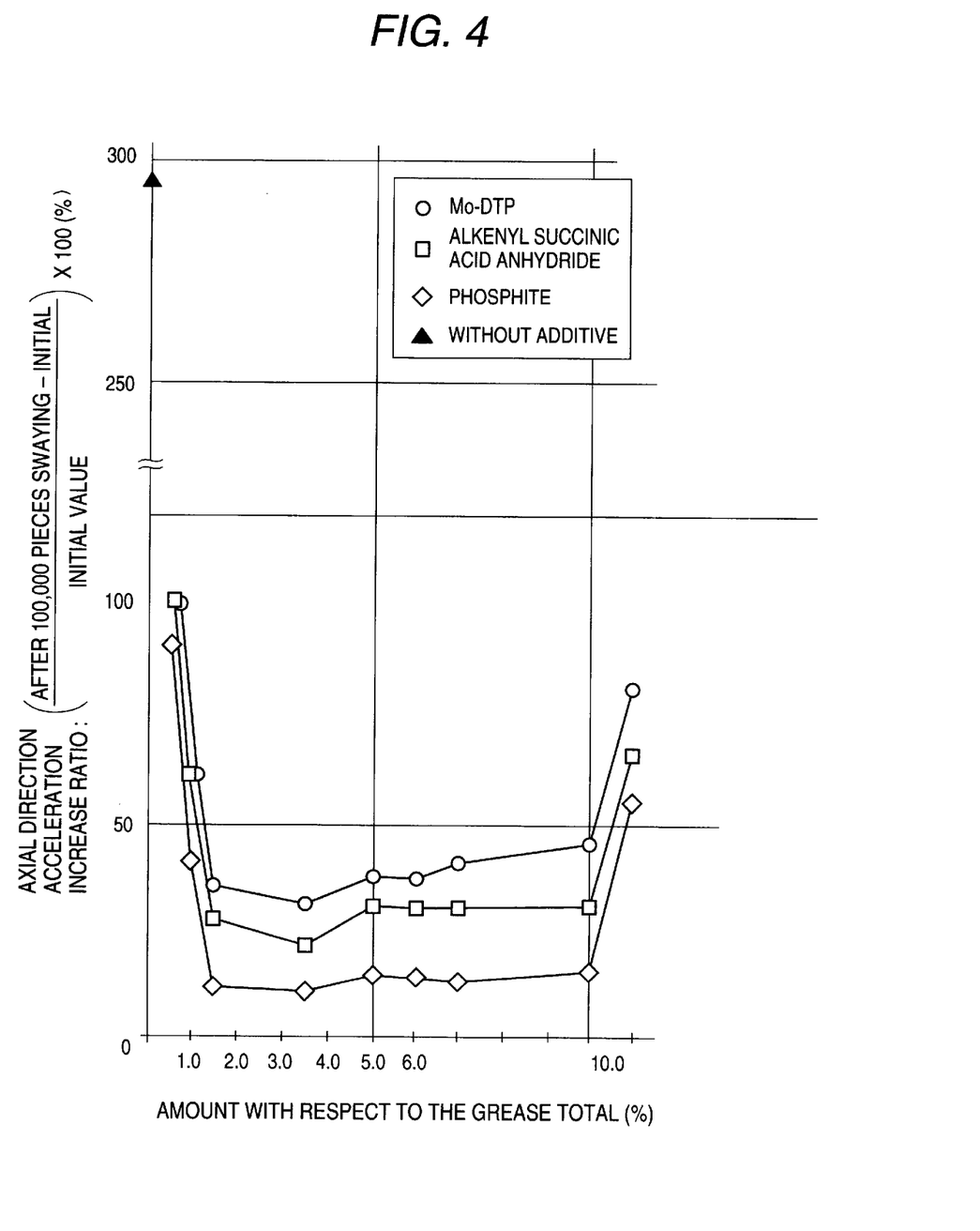
FIG. 4 is a graph illustrating the relationship between the added amount of additives and the percent rise of axial acceleration determined in Example 1.

2.35 mg of each test grease was sealed in the B4-50A (produced by Nihon Seiko Corp.) made of the SUT-2, comprising an outer ring, an inner ring, and a rolling element, applied with quenching and tempering so as to be provided for a fretting test. The fretting test was executed, with the bearing assembled in an HDD spindle, was aged at 70° C. for 2 hours, applied with a 14.7N load in the axial direction, and swaying for 100,000 times at a room temperature by a 4° sway angle and a 9 Hz swaying frequency. The axial direction acceleration after the sway application and the axial direction acceleration before the sway application were compared, and the fretting resistance property was evaluated from the increase ratio thereof. The relationship between the amount of each additive and the increase ratio of the axial direction acceleration is shown in FIG. 4.

As shown in the figure, it is observed that although the size of the increase ratio of the axial direction acceleration, which represents the fretting wear resistance property differs, a 0.5% by weight or more amount satisfies the passing standard of 100% or less for all of the Mo-DTP, the alkenyl succinic acid anhydride, and the phosphate. Moreover, for the preferable passing standard of 50% or less, the lower limit of the amount is 1.5% by weight. From the viewpoint of the fretting life, even if the amount exceeds the 10% by weight, the passing standard of 100% or less is satisfied. However, in the case the three additives are added by more than 10% by weight, the nature of the grease itself is changed so that the initial grease is made harder, and thus the rotational torque can be increased or corrosion can easily be generated on the rolling contact surface. In the comparative example 1 without containing an additive has an increase ratio as large as 300%. This represents an extremely poor sound resistance. From these results, in consideration of the additive introduction effect and the adverse effect by the excessive introduction other than the increase ratio, a 1.5% by weight to 6.0% by weight amount is most preferable.

Example 2

2.35 mg of test greases shown in the table 3 were sealed in the B4-50A (produced by Nihon Seiko Corp.) made of the SUT-2, comprising an outer ring, an inner ring, and a rolling element, applied with quenching and tempering so as to be produce test bearings B-I, B-II, B-III and C. Moreover, with a bearing using a nitride ball instead of the rolling element of the B4-50A, similarly, 2.35 mg of the greases shown in the table 3 were sealed so as to produce test bearings A-I and A-II. The nitride ball was produced by using a rolling element material made from 0.45% by weight of a carbon, 13.05% by weight of a chromium, 0.13% by weight of a nitrogen, and the remainder of a steel, applying a cold work by a header and a trimming or cutting work for shaping into a spherical body, quenching at 1,060° C., applying a sub zero treatment at −80° C., tempering at 160° C., applying a finish process to a predetermined accuracy, applying an Nv nitrogenation process (Daido Hokusan Corp.), and executing a finish lap to the surface roughness accuracy same as that of the steel ball made of the SUJ-2 of the example 1. It has a Hv 1,210 surface hardness and a dense nitride layer with a steel ball diameter ratio 1.4%×Da formed on the surface.

TABLE 3

| Test bearing | Base grease | Additive |
|---|---|---|
| B-I | Base grease I | Mo-DTP (2.5 wt %) + Alkenyl succinic acid anydride (1.0 wt %) |
| B-II | Base grease II | Alkenyl succinic acid anydride (2.5 wt %) |
| B-III | Base grease III | Phosphite (5.0 wt %) |
| C | Base grease IV | None |
| A-I | Base grease I | Mo-DTP (2.5 wt %) + Alkenyl succinic acid anydride (1.0 wt %) |
| A-II | Base grease II | Alkenyl succinic acid anydride (2.5 wt %) |

Figure 5:
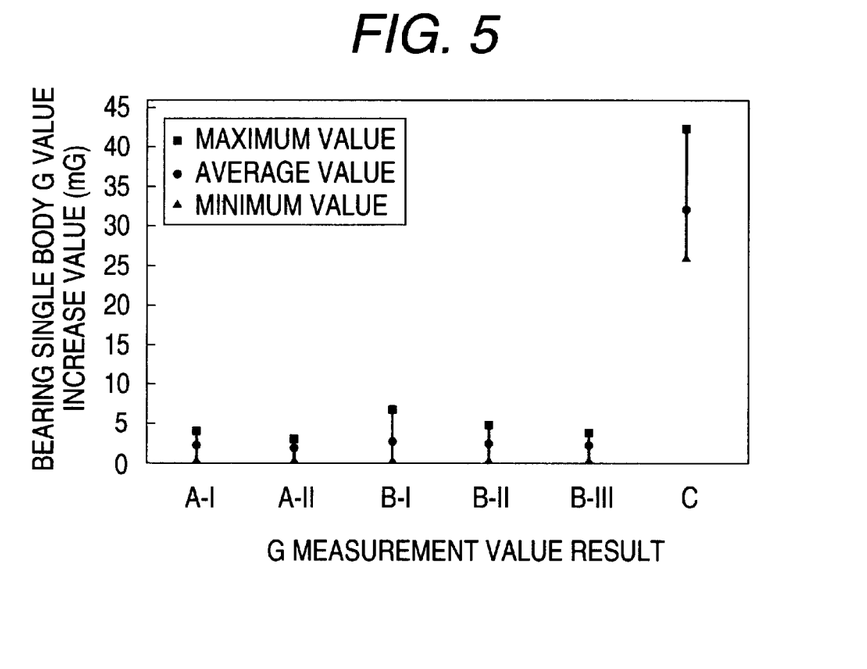
FIG. 5 is a graph illustrating the relationship between the type of grease enclosed and the degree of rise of G value of single bearing determined in Example 2.

Then, each test bearing was applied with swaying in the condition same as that of the example 1. The G value after the sway application and the G value before the sway application were compared, and the fretting resistance property was evaluated from the increase degree thereof. Results are shown in FIG. 5. It is observed that use of a grease containing at least one selected from the group consisting of an organic molybdenum compound, an organic fatty acid compound, and an organic phosphorous compound according to the invention restrains the increase of the G value by swaying, and thus it is effective for improvement of the fretting wear resistance property. Moreover, from the comparison between the test bearings B-I and AI, and B-II and A-I, it is learned that a bearing with the excellent fretting wear resistance property can be obtained by sealing a lubricating grease composition according to the invention in a bearing applied with a nitrogenation process because the G value increase can further be restrained by using a nitride ball instead of the rolling element while using the same grease.

Example 3

Figure 6:
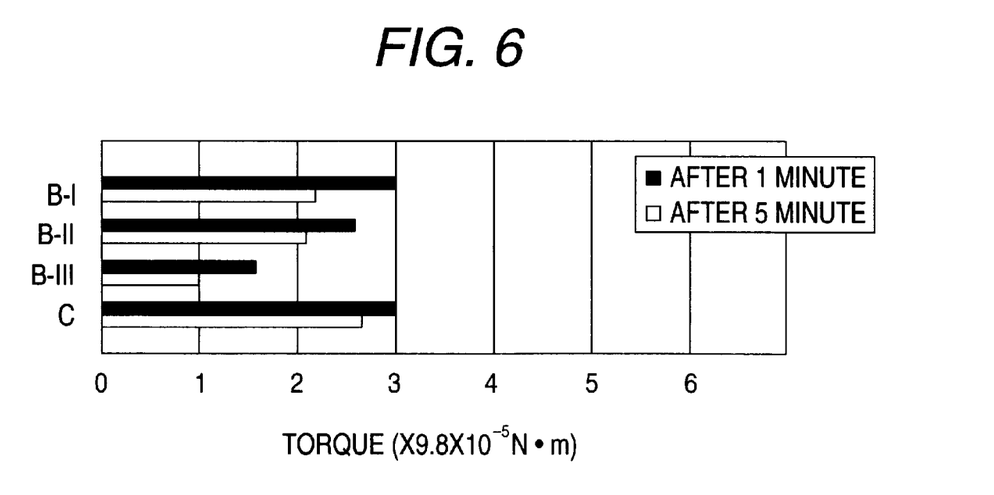
FIG. 6 is a graph illustrating the relationship between the type of grease enclosed and the rotary torque determined in Example 3.

In relation to the example 2, the rotational torque was measured, using the test bearings B-I, B-II, B-III and C. Results are shown in FIG. 6. In the bearings B-I, B-II, and B-III with the basic grease composition according to the invention sealed, the rotational torque is lowered remarkably after 5 minutes rotation. This is assumed to be the result of improvement of the adsorbing effect of the thickener by the function of the organic molybdenum compound, the organic fatty acid compound, and the organic phosphorus compound.

Example 4

As shown in the table 4, using a grease with 5% by weight of an Mo-DTP added to the base grease III of the table 1, and a grease made of only the base grease IV of the table 1, 2.35 mg of each was sealed in a B4-50AIDS (produced by Nihon Seiko Corp.) for producing a test bearing D and a test bearing E. The hearings were used as shown in the table 4.

TABLE 4

| Test bearing | Grease | Inner ring groove diameter ratio/outer ring groove diameter ratio | Bearing single body gap | Initial bearing contact angle |
|---|---|---|---|---|
| D | Base grease III + Mo-DTP (5 wt %) | 51.5/55.0% | 8~13 μm | 17.13' |
| E | Base grease IV | | | |

Figure 7:
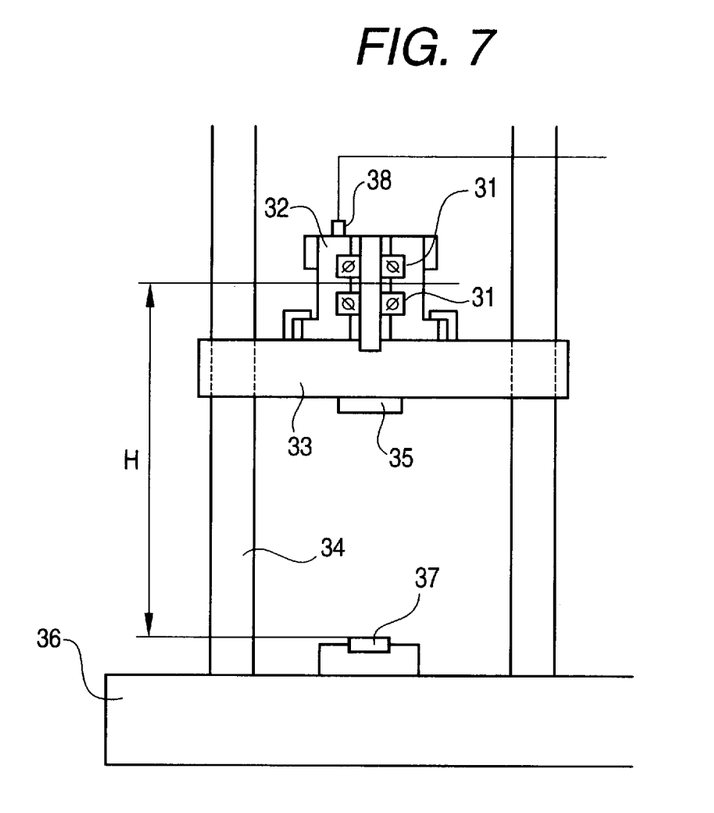
FIG. 7 is a diagram illustrating the configuration of a measuring equipment used in the dropping impact test in Example 4.

As shown in FIG. 7, an HDD spindle 2 with B4-50AIDS (NSK number) 1, 1 assembled was fixed on a ram 3. It was dropped from various heights H while guided by a guide slide 4, and the impact at the time of clash of a steel impact member 5 mounted on the lower surface of the ram 3 and a plastic receiving member 7 mounted on a bolster 6 was measured by an acceleration 8 meter mounted on the upper end part of the spindle 2. The bearings 1, 1 of the spindle 2 were dropped while applying a pre-load of an axial rigidity (877 kgf) 8595N.

Figure 8:
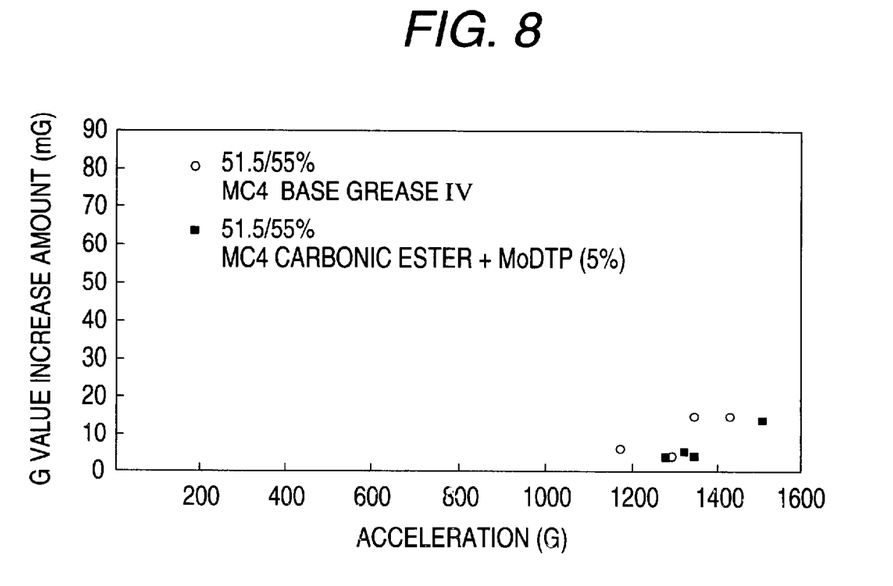
FIG. 8 is a graph illustrating the relationship between the type of grease enclosed and the degree of rise of G value of single bearing determined in Example 3.

FIG. 8 is a graph showing the relationship between the increase value of the G value before and after the drop impact and the acceleration at the time. It shows that the test bearing D with the basic grease according to the invention sealed can endure a larger drop impact acceleration so as to provide a superior drop impact property. This is assumed that the impact resistance property is enhanced by the surface thin film effect by the Mo-DTP.

Moreover, as a result of the similar test using the same base greases with 5.0% by weight of a phosphite added, and 2.5% by weight of an alkenyl succinic acid anhydride added, the substantially same result as the test bearing D was obtained.

Example 5

In order to confirm the effect of the rolling apparatus of the invention, an oscillation durability test was made using a linear guide.

To the basic grease compositions set forth in Table 5 as preferred examples of grease to be enclosed in the rolling apparatus of the invention each were added various additives such as molybdenum dithiophosphate, alkenylsuccinic anhydride and phosphorous acid ester in an amount of from 0 to 15% by weight as set forth in Table 6 below.

TABLE 5

| Base grease | V | VI | VII | VIII |
|---|---|---|---|---|
| Thickening agent | 1 | 1 | 1 | 1 |
| (added amount: wt-%) | 15 wt-% | 15 wt-% | 20 wt-% | 15 wt-% |
| Base oil (balance) | A | A + B (50:50) | A | B + C (80:20) |
| Dynamic viscosity of base oil mm$^2$/s, 40° C. | 18 | 38 | 18 | 26 |
| Mixed viscosity (25° C.) | 297 | 287 | 261 | 250 |
| Dropping point ° C. | 186 | 182 | 185 | 192 |

Thickening agent:
1: Lithium stearate
2: 12-Hydroxystearic acid lithium salt
Ester-based synthetic oil
A: Carbonic acid ester oil (18 mm$^2$/s, 40° C.)
B: Pentaerythritol ester oil (133 mm$^2$/s, 40° C.)
C: Dioctyl sebacate oil (12 mm$^2$/s, 40° C.)

TABLE 6

| Additives (wt-%) | Base grease V | | | | | | | | | | | | | | | |
|---|---|---|---|---|---|---|---|---|---|---|---|---|---|---|---|---|
| | A | B | C | A | B | C | A | B | C | A | B | C | A+B+C | A+B | A+C | B+C |
| 0 | X | X | X | X | X | X | X | X | X | X | X | X | X | X | X | X |
| 0.2 | X | X | X | X | X | X | X | X | X | X | X | X | — | — | — | — |
| 0.5 | Δ | Δ | Δ | Δ | Δ | Δ | Δ | Δ | Δ | Δ | Δ | Δ | — | — | — | — |
| 1.0 | Δ | Δ | Δ | Δ | Δ | Δ | Δ | Δ | Δ | Δ | Δ | Δ | — | Δ | Δ | Δ |
| 1.5 | ○ | ○ | ○ | ○ | ○ | ○ | ○ | ○ | ○ | ○ | ○ | ○ | ○ | — | — | — |
| 3.0 | ○ | ○ | ○ | ○ | ○ | ○ | ○ | ○ | ○ | ○ | ○ | ○ | ○ | ○ | ○ | ○ |
| 6.0 | ○ | ○ | ○ | ○ | ○ | ○ | ○ | ○ | ○ | ○ | ○ | ○ | ○ | — | — | — |
| 10.0 | ○ | ○ | ○ | ○ | ○ | ○ | ○ | ○ | ○ | ○ | ○ | ○ | ○ | ○ | ○ | ○ |
| 15.0 | Δ | Δ | Δ | Δ | Δ | Δ | Δ | Δ | Δ | Δ | Δ | Δ | Δ | — | — | — |

A: Molybdenum dithiophosphate
B: Alkenylsuccinic anhydride

Figure 9:
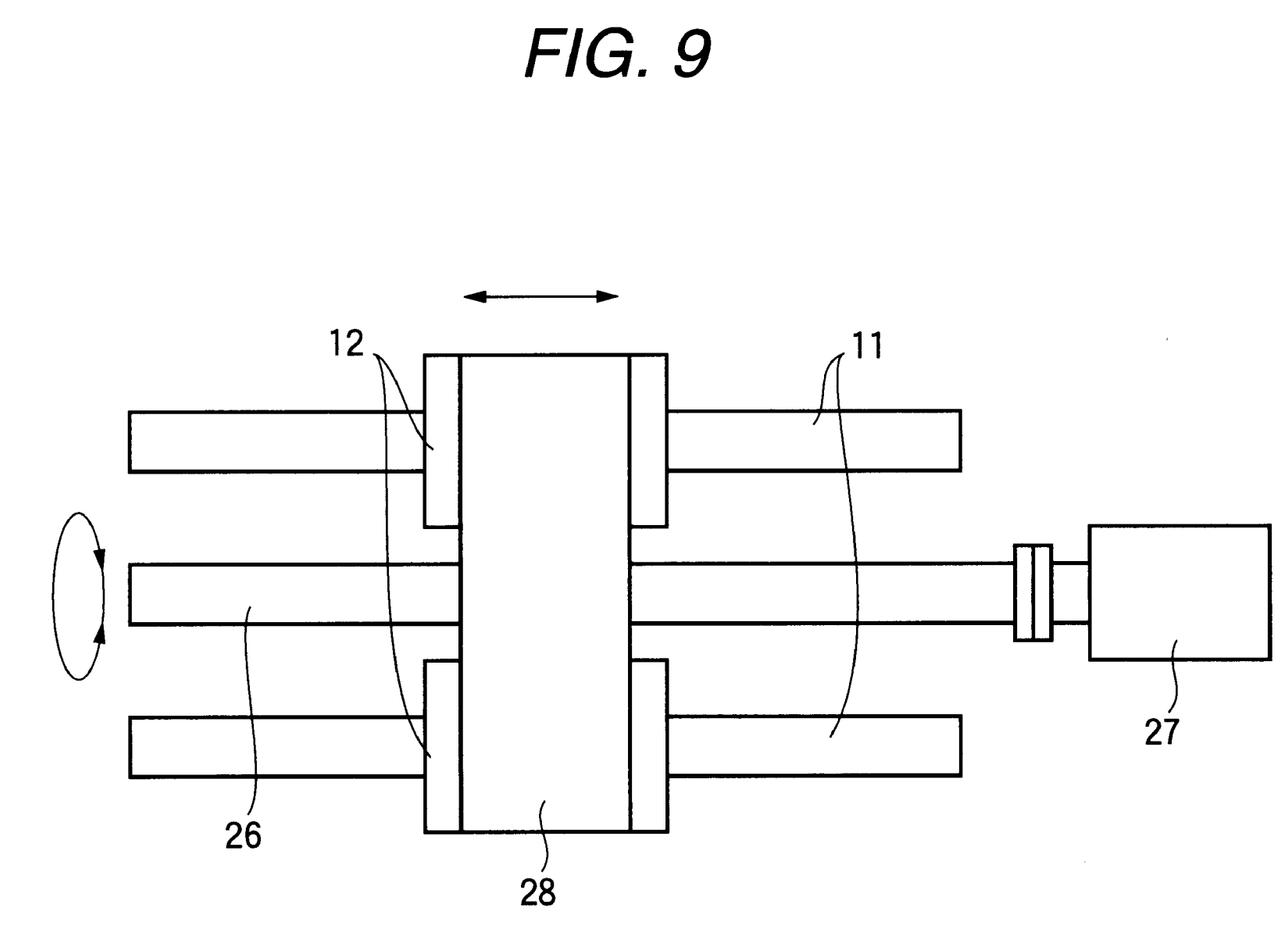
FIG. 9 is a schematic view illustrating a testing equipment used in the oscillation durability test in Example 5.

As the linear guide to be tested there was used one having Call No. LH250535. The linear guide was then filled with a grease composition. The linear guide was then subjected to oscillation durability test using an oscillation durability testing equipment as shown in FIG. 9. In the testing equipment shown, two sets of testing linear guides having the same specification mounted on a table in parallel. Both the two sliders are fixed to a fixing plate 28. The fixing plate 28 is fixed to the nut of a ball screw 26 mounted between the two testing linear guides. In this arrangement, when the ball screw 26 is driven by a servo motor 27 to rotate with oscillation, the slider 12 makes oscillatory motion. Referring to the testing conditions, the frequency is 10 Hz, the oscillation stroke is 5 mm, the face pressure is 1.7 GPa, and the repeated number of oscillation is $1 \times 10^7$.

For the judgment of test results, the testing linear guide thus tested was disassembled. The surface of race (second contact surface) on the guide rail 11 was then observed. The surface conditions were then judged according to the following criterion. The results are set forth in Table 6.

Little or no damage on the surface of race: ○ (acceptable)
Running mark on the surface of race: Δ (acceptable)
Fretting abrasion on the surface of race: X (unacceptable)

As can be seen in Table 6, all the testing linear guides comprising a grease composition containing 0.5 wt-% or more of an additive enclosed therein showed no abrasion and thus were acceptable. The testing linear guides comprising a grease composition containing less than 0.5 wt-% of an additive enclosed therein didn't obtain a sufficient effect and underwent fretting abrasion. The grease compositions containing more than 10 wt-% of an additive showed property change themselves and thus were hardened, causing torque rise or corrosion on the rolling surface resulting in the occurrence of running mark.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

As mentioned above, the present invention provides a lubricating grease composition which can provide excellence in fretting abrasion resistance and impact resistance, not to mention lubricating properties. The incorporation of this lubricating grease makes it possible to provide a rolling bearing and a rolling apparatus having improved fretting abrasion resistance, impact resistance and low torque properties.

What is claimed is:

1. A lubricating grease composition having a basic grease composition containing:

a base oil, which is at least one selected from the group consisting of a carbonic ester oil and a polyol ester oil;

a thickener, which is at least one selected from the group consisting of a lithium stearate and a 12-hydroxy lithium stearate; and wherein 0.5 to 10% by weight with respect to the basic grease composition total amount of at least one additive selected from the group consisting of an organic molybdenum compound, an organic fatty acid compound or a derivative thereof, and an organic phosphorus compound is added, wherein the base oil has kinematic viscosity in the range of from 15 to 150 mm$^2$/s at 40° C., and wherein the amount of the thickener is in the range of from 5 to 25% by weight with respect to the basic grease composition total amount.

2. The lubricating grease composition according to claim 1, wherein the organic molybdenum compound is a molybdenum dithiophosphate, the organic fatty acid compound or the derivative thereof is an alkenyl succinic acid or an anhydride thereof, and the organic phosphorus compound is a phosphite.

3. The lubricating grease composition according to claim 1, wherein the amount of the additive is 1.5 to 6.0% by weight.

4. The lubricating grease composition according to claim 2, wherein the amount of the additive is 1.5 to 6.0% by weight.

5. The rolling apparatus according to claim 1, wherein said exterior member is an outer ring of a bearing, and said interior member is an inner ring of said bearing.

6. The lubricating grease composition according to claim 1, wherein the at least one additive is the organic phosphorus compound.

7. The lubricating grease composition according to claim 1, wherein the amount of the grease composition that is to be packed in a bearing space of a bearing sealed with a sealing member is in the range of 5% to 20% by volume of the bearing space.

8. The lubricating grease composition according to claim 1, wherein the amount of lubricating grease composition that is applied in a bearing space, which is defined by interior and exterior members and rolling elements therebetween, is 5 to 20% by volume of the bearing space.

9. The lubricating grease composition according to claim 1, wherein the lubricating grease composition is adapted to a bearing that comprises a bearing single body gap and a predetermined contact angle when the bearing is assembled.

10. The lubricating grease composition according to claim 1, wherein the lubricating grease composition is adapted to a screw shaft.

11. The lubricating grease composition according to claim 1, wherein the lubricating grease composition is adapted to a guide rail.

12. The lubricating grease composition according to claim 1, wherein the grease composition has a mixture consistency in the range of from 250 to 301.

* * * * *